Jan. 14, 1936.   F. N. BECKER   2,027,762
VALVE
Filed July 17, 1933
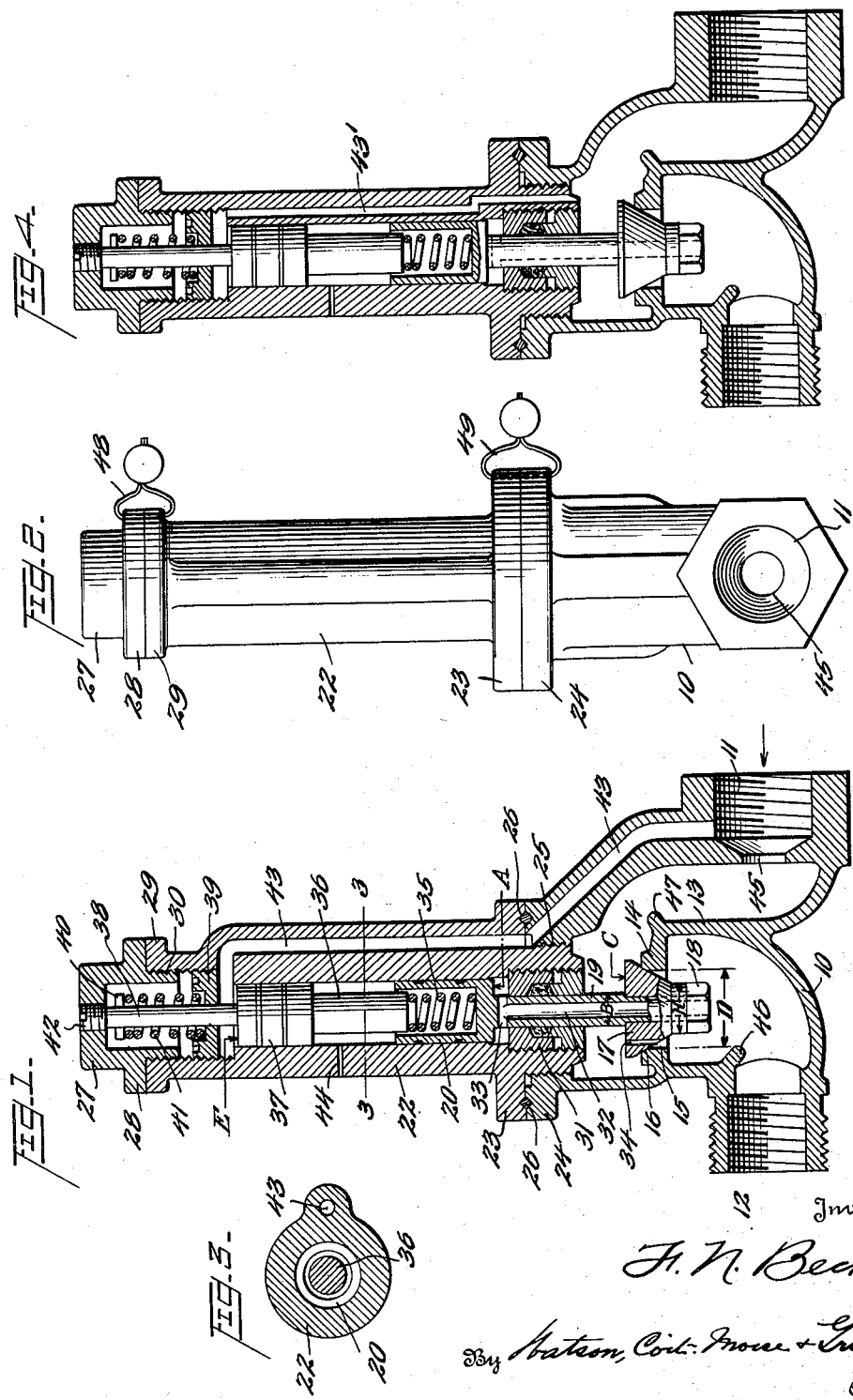
Inventor
F. N. Becker,
By Watson, Coit, Morse & Grindle
Attorney Patented Jan. 14, 1936

2,027,762

UNITED STATES PATENT OFFICE 2,027,762

VALVE

Frank N. Becker, Jeddo, Pa., assignor to Jeddo-Highland Coal Company, Jeddo, Pa., a corporation of Pennsylvania Application July 17, 1933, Serial No. 680,833

11 Claims. (Cl. 137—152.5)

The present invention relates to valves and more particularly to automatic stop valves. Many tools, for example, hammers, drills, and other devices of a like nature, are operated by fluid under pressure, for example, compressed air. The air is compressed at one point and delivered by means of mains to the various tools which are actuated under the guidance of an operator. For example, in coal mines various types of compressed air actuated tools are employed, the compressed air being conducted to the various parts of the mines by means of the mains, all of which receive their supply preferably from a common source.

It has been found, particularly in the case of coal mines, that the operators of such tools, when occasion arises, disconnect the tools from the compressed air mains and allow the compressed air to escape. Oftentimes, for instance, miners waste this compressed air into the mine headings for the purpose of clearing the atmosphere of poisonous gases resulting from blasting or otherwise entering the mine. Of course this throws a heavy load on the air compressor and results in lowering the air pressure in the mains, and greatly increases the cost of operation.

The present invention aims to provide a valve that will automatically close and shut off the supply of air if too much air is wasted by the operator of the tool.

A further object of the invention is to provide a valve that closes if the quantity of air flowing through the same exceeds a certain amount depending on the supply pressure.

Another object is to provide a valve that closes if the pressure on the outlet side falls below a certain amount, this amount varying with the supply pressure.

Another object of the invention is to provide a valve of the foregoing type wherein the force tending to close the same varies in accordance with the supply pressure.

Another object is to provide an automatic stop valve that closes at a substantially constant decrement of pressure between the inlet and outlet pressures regardless of variations of the inlet pressure.

Another object is to provide a valve that will automatically close on relatively small differences of pressure between the inlet and outlet pressures.

Another object is to provide means to prevent tampering with the valve or its operation.

Another object is to provide an automatic valve of simple construction to accomplish these objects.

Another object is to provide a generally improved automatic stop valve of the type mentioned.

Other objects and features of novelty will be apparent from the description taken in connection with the drawing, in which Figure 1 is a vertical sectional elevational view taken through one form of valve constructed in accordance with this invention;

Figure 2 is a side elevation of the valve;

Figure 3 is a transverse sectional view taken on the line 3—3 of Fig. 1; and

Figure 4 is a sectional view like Fig. 1, showing a modified construction.

Referring to the drawing, the reference numeral 10 indicates the hollow body of the valve having a threaded inlet 11 and a threaded outlet 12 connected by a suitable passage in a well-known manner. This passage is formed by a vertical wall or partition 13 joined at its upper edge to the horizontal partition 14, having an opening 15 therethrough provided at its upper edge with a bevel constituting a seat 16 for the conical closure member 17. Secured to this closure member in any suitable manner, as by means of the nut 18, is a vertically disposed piston rod or valve stem 19, at its upper end carrying the hollow piston 20 open at its upper end. This piston is disposed in a cylinder member 22 which has a flange 23 at its lower end fitting against the corresponding flange 24 on the valve body, the two flanges being held in fluid-tight relation by the screw threads 25 and a suitable packing 26 if desired.

The upper end of the cylinder member 22 is closed by a cap 27 having a flange 28 held in fluid-tight relation against a corresponding flange 29 on the cylinder by means of the screw threads 30.

The lower end of the cylinder is closed by a suitable stuffing box 31 through which the piston rod 19 slides. This rod or valve stem is formed with a vertical port or bore 32, at its upper end in communication with the transverse port or passage 33 and at its lower end in communication with the outlet side of the valve. In this manner the outlet side of the valve is in communication with the lower part of the cylinder 22.

The position of the lower end of the bore 32 is such that even when the valve is wide open, such lower end does not rise above the partition 14. In other words, this bore is always in communication with the outlet side of the valve and hence the lower side of the piston 20 is subject to the outlet pressure.

A small bleeder passage 34 is provided to afford communication between the inlet and outlet sides of the valve when the closure member is closed. In the form shown this bleeder passage is in the closure member 17 itself.

Disposed within the piston 20 is a spring 35 one end of which acts against the piston and the other of which abuts a cylindrical extension 36 on a second piston 37 disposed in the cylinder member 22. This piston 37 carries an upwardly projecting rod or stem 38, and is actuated in an upward direction by a spring 41 disposed between a screw abutment plug 39 and pin 40 on the rod 38. The upper end of this rod abuts an adjustable stop plug 42 threaded into the cap 27.

The upper end of the cylinder 22 is in communication with the high pressure side of the valve by means of a port or passage 43. A passage 44 is provided to vent the space between the two pistons.

If desired, the valve body may be provided with a reduced orifice 45 on the high pressure side thereof for the purpose of throttling the flow or air and making the valve more sensitive and quicker closing. Flanges 46 and 47 may be provided to prevent the operator from reaching and tampering with the closure member or interior parts by any instrument.

Further to prevent tampering, the valve may be sealed as indicated at 48 and 49.

In operation, assuming the valve closed and air under pressure supplied to the inlet side thereof, the air will flow through the bleeder 34 until the pressure on the outlet side of the valve is sufficient to open the valve. The force tending to keep the valve closed is due to the spring 35. The force tending to open the valve is that due to the pressure acting on the area D and the annular area A. The tension of the spring 35 and thereby the pressure at which the valve will open, is adjusted by the stop plug 42. After a pressure slightly less than the inlet pressure has been built up in the outlet side of the valve, the valve closure will rise, thereby permitting the tool to be supplied with compressed air. The valve will remain open as long as pressure in the outlet side thereof does not fall more than a predetermined number of pounds per square inch relative to the inlet pressure, even if the inlet pressure varies considerably. When the valve is in its open position, the force tending to keep it open is due to the air pressure acting on the annular area A and an area equivalent to the valve stem B. The force tending to close the valve is that due to the spring 35.

It has been found that if the stop plug 42 is maintained at a single setting, the valve will not close at the proper pressure drop when the inlet pressures vary. In order to increase the compression of spring 35 with increased pressures on the inlet side of the valve, the second piston 37 is provided and is subjected to the pressure on the inlet side of the valve. In this manner it acts to compress the spring 35 in proportion to the main line pressure.

In order that the valve will open, it is necessary to supply slightly less force to the bottom spring than the top piston will deliver, and for this reason a subtracting spring 41 is employed. This acts to subtract a definite amount of force from the force acting on the piston 37, and the force subtracted varies with the increase in pressure in the inlet of the valve for the reason that the greater the inlet pressure the greater the amount of compression of the spring.

Perhaps the design and operation of the valve will be better understood if specific figures are given, it being understood, however, that the invention is to be in no way limited because of these particular examples.

Let A=.4137 sq. in.=annular area of lower piston
B=.1105 sq. in.=area of valve stem
C=.6749 sq. in.=annular area of top of valve closure
D=.7854 sq. in.=area of bottom of valve closure
E=.5242 sq. in.=area of upper piston
D−H=.4418 sq. in.=area of valve opening Assume that the pressure at the inlet side of the valve is 60 pounds per square inch and that the valve is to open when the pressure on the outlet side becomes 58 pounds per square inch.

Valve closed:
  Opening force = $(A+D) \times 58$ pounds = 69.55 pounds.
  Closing force=$C \times 60$ pounds=40.49 pounds.
  Force exerted by spring 35 to balance=29.06 pounds.
  Hence use a 29-pound spring.

Valve open:
  Opening force=$(A+B) \times 60$ pounds=30.45 pounds.
  Closing force = force of spring 35 = 29.00 pounds.
  Unbalanced opening force=2.45 pounds.

Pressure in outlet at which valve will close:
  Pressure ($P^C$) at which valve will close:

$$P^C = \frac{29}{A+B} = 55.4 \text{ pounds per sq. in.}$$

In upper chamber:
  Force to compress spring $35 = 60 \times E = 31.45$ pounds.
  To hold piston 37 from exerting pressure on spring 35 in excess of the 29 pounds:
  31.45−29=2.45=rate of spring 41.

Hence, with inlet pressure 60 pounds:
  Valve opens at 58 pounds per sq. in.
  Valve closes when the outlet pressure=54.5 pounds per sq. in.

To show the forces acting when the pressure is increased, say, to 100 pounds per square inch on the inlet side, the following is given:

Valve closed:
  Spring $37 = 100$ pounds$\times E$−spring $41 = 49.97$ pounds.
  Closing force=100 pounds$\times C$+spring $35=$ 117.46 pounds.

$$\text{Opening pressure} = \frac{117.46}{A+B} = 98.0 \text{ pounds per sq. in.}$$

Valve open:
  Opening force=$(A+B) \times 100 = 52.42$ pounds.
  Closing force=spring $37 = 49.97$ pounds.
  Unbalanced opening force=2.45 pounds.

Pressure ($P^C$) at which valve closes:

$$P^C = \frac{49.97}{A+B} = 95.5 \text{ pounds per sq. in.}$$

Hence, with the inlet pressure 100 pounds per sq. in.:
  Valve opens with outlet pressure=98 pounds per sq. in.
  Valve closes with outlet pressure=95.5 pounds per sq. in.

From the foregoing examples it is seen that the differential between the inlet and outlet pressures to open the valve is the same or is approximately the same regardless of the inlet pressure. Thus, the valve opened when the outlet pressure had built up within two pounds of the inlet pressure in both of the examples given above.

Furthermore, the decrement in pressure between the inlet and outlet pressures that causes the valve to close is substantially the same regardless of the value of the inlet pressure. For the two examples given above, this decrement was approximately 4.5 pounds per square inch.

It will be observed that it is the drop of pressure in the outlet as compared with the pressure in the inlet of the valve that causes it to close automatically. Hence, if such an amount of air is used by the operator or wasted as to cause the necessary drop, the valve will close and prevent the waste. When there is a waste of air, the orifice 45 tends to cause a more rapid drop of the pressure on the outlet side than if no orifice were present. This is because of its throttling effect. As it is the drop of pressure on the outlet side of the valve that closes the same, it follows that the orifice has the effect of causing the valve to close more rapidly than it would if no orifice were provided.

It is apparent that when the valve is closed, mechanical pressure is transmitted to the closure member 17 from the spring 35 in proportion to the adjustment of the stop plug 42. The setting of this plug determines the pressure in the outlet of the valve that will open the closure member. Screwing the plug 42 downwardly will increase the opening pressure.

Fig. 4 shows a modification which is substantially the same in all respects as that shown in Fig. 1 except that the orifice 45 of Fig. 1 is omitted. The only other difference is that the port or passage 43' connecting the interior of the body of the valve with the upper end of the cylinder is differently disposed.

Having thus described the invention, what is claimed as new and desired to be secured by Letters Patent is:

1. An automatic stop valve of the type described, including in combination, a body having an inlet and outlet in communication through a passage in the body, a closure member movable to establish or cut off communication between said inlet and outlet, a bleeder passage connecting the inlet and outlet, a cylinder having a piston therein, a piston rod connecting the piston and closure member, a port affording communication between the cylinder and outlet side of the closure member, a spring having one end acting on said piston to force it in the direction to close the valve member, and means to subject the other end of the spring to a force varying as the fluid pressure on the inlet side of the valve member.

2. An automatic stop valve in accordance with claim 1 wherein the last mentioned means comprises a second piston in said cylinder acting on said spring and a port affording communication between the corresponding end of the cylinder and the interior of the body on the high pressure side of the closure member.

3. An automatic stop valve in accordance with claim 1 wherein the last mentioned means comprises a second piston in said cylinder acting on said spring and means to subject said second piston to fluid pressure from the high pressure side of said closure member.

4. An automatic stop valve of the type described including in combination a body having an inlet and outlet in communication through a passage in the body, said passage including a restricted orifice intermediate said inlet and outlet, valve means to establish a cut-off communication between said inlet and outlet, means to utilize the fluid pressure on the outlet side of said valve means to open said valve means, means to close the valve means in opposition to said opening means when the fluid pressure on the outlet side of the valve means falls below a point slightly below that on the inlet side, and means to vary the force of said closing means dependent on variations of fluid pressure on the inlet side of the valve, whereby the valve closes at a substantially constant decrement between inlet and outlet pressures regardless of variations in the inlet pressure.

5. An automatic stop valve of the type described including in combination, a body having an inlet and outlet in communication through a passage in the body, a closure member movable to establish or cut off communication between the inlet and outlet, a bleeder passage connecting the inlet and outlet, a cylinder having a piston therein, a piston rod connecting the piston and closure member, a port affording communication between the cylinder and outlet side of the valve member, a spring having one end acting on said piston to force it in the direction to close the closure member, and means to subject the other end of the spring to a force varying as the fluid pressure on the inlet side of the closure member, said body having a reduced orifice located between said inlet and closure member.

6. An automatic stop valve of the type described including in combination, a body having an inlet and an outlet in communication through a passage in the body, a closure member movable to establish or cut off communication between the inlet and outlet, a bleeder passage connecting the inlet and outlet, a cylinder having a piston therein, a piston rod connecting the piston and closure member, a port affording communication between the cylinder and outlet side of the closure member, a spring acting on said piston to force it in the direction to close the closure member, a second piston in said cylinder acting on said spring and a port connecting the corresponding end of the cylinder and the interior of the body on the high pressure side of said closure member, said body having a reduced orifice located between said inlet and closure means.

7. An automatic stop valve of the type described, including in combination, a body having an inlet and outlet in communication through a passage in the body, a closure member movable to establish or cut off communication between the inlet and outlet, a bleeder passage connecting the inlet and outlet, a cylinder having a piston therein, a piston rod connecting the piston and closure member, a port affording communication between the cylinder and the outlet side of the closure member, a spring having one end acting on said piston to force it in the direction to close the closure member, a second piston in said cylinder acting on said spring, a port connecting the corresponding end of the cylinder and the interior of the body on the high pressure side of said closure member, and a second spring weaker than the first acting to oppose movement of the second piston in a direction to compress the first spring.

8. An automatic stop valve of the type described, including in combination, a body having an inlet and outlet in communication through a passage in the body, a closure member movable to establish or cut off communication between said inlet and outlet, a bleeder passage connecting the inlet and outlet, a cylinder having a piston therein, a piston rod connecting the piston and closure member, a port affording communication between the cylinder and outlet side of the closure member, a spring having one end acting on said piston to force it in the direction to close the valve member, a second piston in said cylinder acting on said spring, means to subject said second piston to fluid pressure on the high pressure side of said valve member, and a second spring weaker than the first acting to oppose movement of the second piston in a direction to compress the first spring.

9. An automatic stop valve of the type described, including in combination, a body having an inlet and outlet in communication through a passage in the body, a closure member movable to establish or cut off communication between said inlet and outlet, a bleeder passage connecting the inlet and outlet, a cylinder having a piston therein, a piston rod connecting the piston and closure member, a port affording communication between the cylinder and outlet side of the closure member, a spring having one end acting on said piston to force it in the direction to close the valve member, a second piston in said cylinder acting on said spring, a port connecting the corresponding end of the cylinder and the interior of the body on the high pressure side of said member, a second spring weaker than the first acting to oppose movement of the second piston in a direction to compress the first spring, and an adjustable stop limiting movement of the second piston under influence of the springs.

10. An automatic stop valve of the type described including in combination, a body having an inlet and an outlet in communication through a passage in the body, a closure member, a cylinder mounted on said body, a piston in said cylinder rigidly connected with said member, a port connecting the corresponding end of the cylinder and the low pressure side of the valve body, a second piston in said cylinder, a spring interposed between the two pistons, a reduced orifice in the body located between the inlet and the closure member, a port connecting the second-piston-end of the cylinder and the inlet on the high pressure side of said orifice, a second spring weaker than the first acting to oppose movement of the second piston in a direction to compress the first spring, and an adjustable stop limiting movement of the second piston under influence of the springs.

11. An automatic stop valve of the type described including in combination, a body having an inlet and outlet in communication through a passage in the body, valve means to establish or cut off communication between said inlet and outlet, means to hold said valve means open as long as the pressure on the outlet side does not drop below a point slightly below the inlet pressure, and means to close said valve means at a constant decrement between inlet and outlet pressures regardless of variations in the inlet pressure including two members of substantially equal areas, one subject to inlet pressure and the other to outlet pressure.

FRANK N. BECKER.